D. P. SHARP.
Horse Hay-Rakes.
No. 209,928.        Patented Nov. 12, 1878.
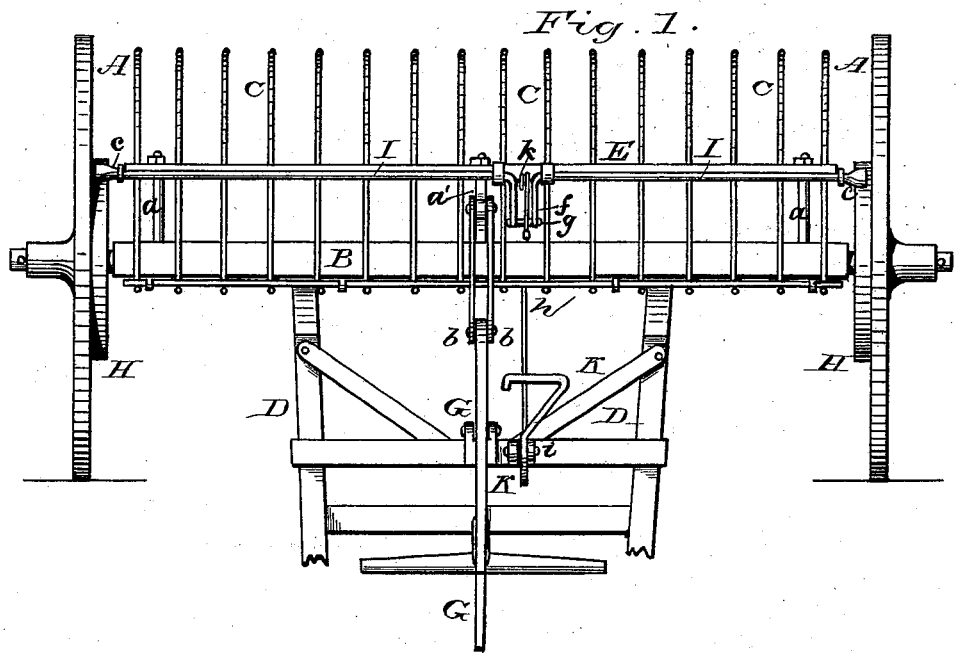
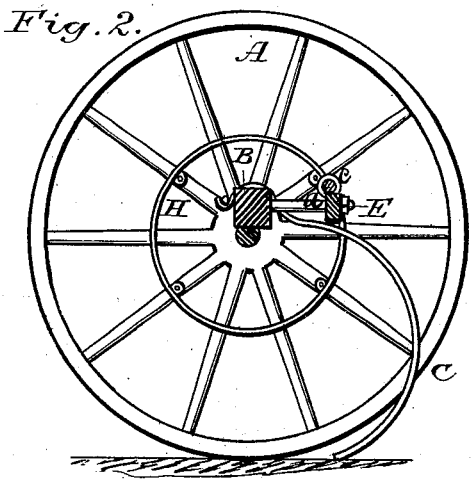
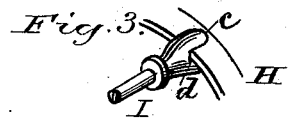
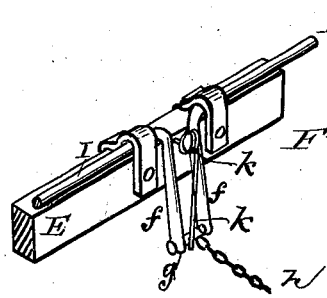
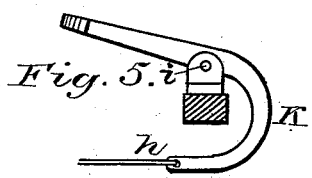
Witnesses:
Louis Spahn.
R. E. White
Inventor:
Dennis P. Sharp,
pr R. F. Osgood,
Atty.

UNITED STATES PATENT OFFICE.

DENNIS P. SHARP, OF ITHACA, NEW YORK, ASSIGNOR TO CHARLES M. SHARP, OF SAME PLACE.

IMPROVEMENT IN HORSE HAY-RAKES.

Specification forming part of Letters Patent No. 209,928, dated November 12, 1878; application filed October 3, 1878.

*To all whom it may concern:*

Be it known that I, DENNIS P. SHARP, of Ithaca, in the county of Tompkins and State of New York, have invented a certain new and useful Improvement in Horse-Rakes; and I do hereby declare that the following is a full, clear, and exact description of the same, reference being had to the accompanying drawings, in which—

Figure 1 is a plan of the horse-rake. Fig. 2 is a cross-section. Figs. 3, 4, and 5 are detail views.

My improvement relates to mounted horse-rakes. It is an improvement on my patent of February 22, 1876, in which the teeth are raised to dump the load by means of two lugs on a rocker, which embrace a flange on the hub of the wheel. In that patent the rocker is applied directly to the axle, upon which the teeth are situated.

My present invention consists in the combination of certain parts connected with the rider-bar in rear of the axle, having cramping-lugs, which engage with rims on the wheel, in the manner above described, so that the axle, with its teeth, and the hubs of the wheels, are free and independent of the said parts, as hereinafter more fully described.

In the drawings, A A represent the wheels; B, the axle; C C, the teeth attached thereto; and D D are the thills. These parts are arranged in the ordinary manner. E is the rider or presser bar, attached rigidly in the rear of the axle by stays $a\,a$, and this also is arranged in the usual way. A hand-lever, G, pivoted to a cross-bar of the thills, is connected with a center stay, $a'$, between the axle and rider-bar, by means of links $b\,b$, so that the axle may be turned and the teeth raised to dump the load by simply moving said lever, this device being also of well-known construction.

My improvement is as follows: H H are two open rims, bolted on the inside of the wheels, being of a diameter equal to the projection of the rider-bar from the axle, more or less. I I are two rods, secured in bearings on top of the rider-bar, so as to be turned axially. At the outer ends these rods have cleft heads $c\,c$, the clefts or slots $d\,d$ of same embracing the edges of rims H H, as clearly shown in Fig. 3. In their normal position the heads do not bind upon the rims, but the rims run free through the slots of the same; but when the rods I I are turned axially, then said heads bind on the rims, on the inside and outside, and the rods, together with the rider-bar, turn up or around with the wheels, and consequently the axle is turned and the teeth are raised to dump the load. At the inner ends the two rods I I are turned downward, forming crank ends $f\!f$, and these are connected at the bottom by a cross-pin, $g$, thus forming the two ends into a crank. From this crank a chain, rod, or other connection, $h$, extends forward, and attaches to the end of a foot-lever, K, Figs. 1 and 5, which is pivoted at $i$ on top of the cross-bar of the thills, the top part of the foot-lever extending back over the cross-bar in convenient position to receive the foot, while the lower part extends back under the cross-piece in such a manner that when pressure is applied on top it will produce a draw upon chain or connection $h$, consequently turning the rods I I. A spring, $k$, of any desired construction, is located between the ends $f\!f$ of the crank, which presses said crank backward, and holds the rods I I in position for the wheels to revolve freely, except when drawn upon by the foot-lever.

The prime object of this invention is to secure cheapness and simplicity of construction by locating the rods on the rider-bar, and connecting them directly and without intermediate parts with rims projecting from the wheels. By this means, also, the axle is left unobstructed and free, so that the teeth can be applied or removed without trouble. A surer and more effective connection with the wheels is also made for dumping the load.

I am aware that in my patent of October 24, 1876, the rods are located on the rider-bar; but in that case intermediate connections are made between the rods and the rocker on the axle, and the rider-bar, together with the teeth, is raised by the turning of the axle. Such I do not claim in this application.

I claim—

1. In a mounted horse-rake, the combination, with the rims H H, attached to the wheels, of the rods I I, mounted upon the rider-bar, and connecting directly with said rims by the slotted heads $c\ c$ of the rods, as shown and described, and for the purpose specified.

2. In a mounted horse-rake, the combination of the rims H H, attached to the wheels, the rods I I, mounted upon the rider-bar, and provided with slotted heads connecting with said rims, the cranks $f\!f$, connection $h$, and foot-lever K, as shown and described, and for the purpose specified.

In witness whereof I have hereunto signed my name in the presence of two subscribing witnesses.

DENNIS P. SHARP.

Witnesses:
J. A. BROWNELL,
J. A. MAXWELL.